Figure 1:
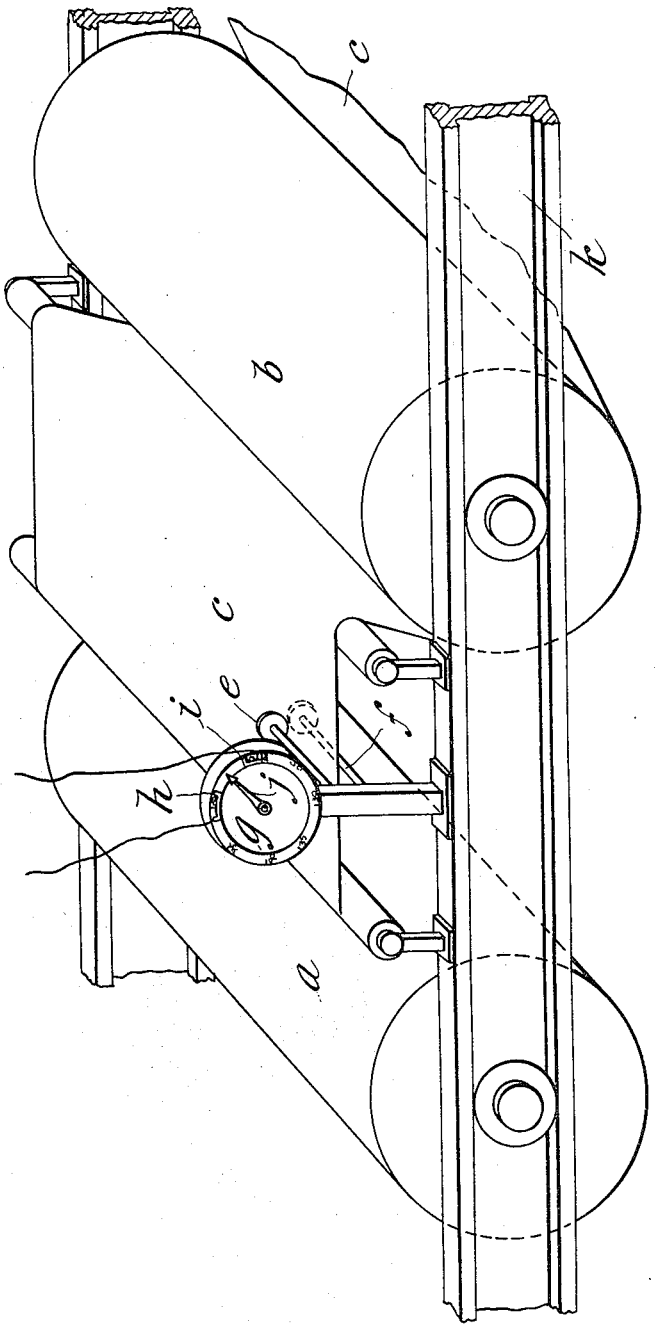

H. BROWN.
APPARATUS FOR CONTROLLING THE THICKNESS OF PAPER.
APPLICATION FILED OCT. 1, 1912.

1,157,204.

Patented Oct. 19, 1915.
2 SHEETS—SHEET 1.

WITNESSES:
R M Mowry
W. P. Noble

INVENTOR,
Howard Brown,
BY
Chapin & Co
ATTORNEYS

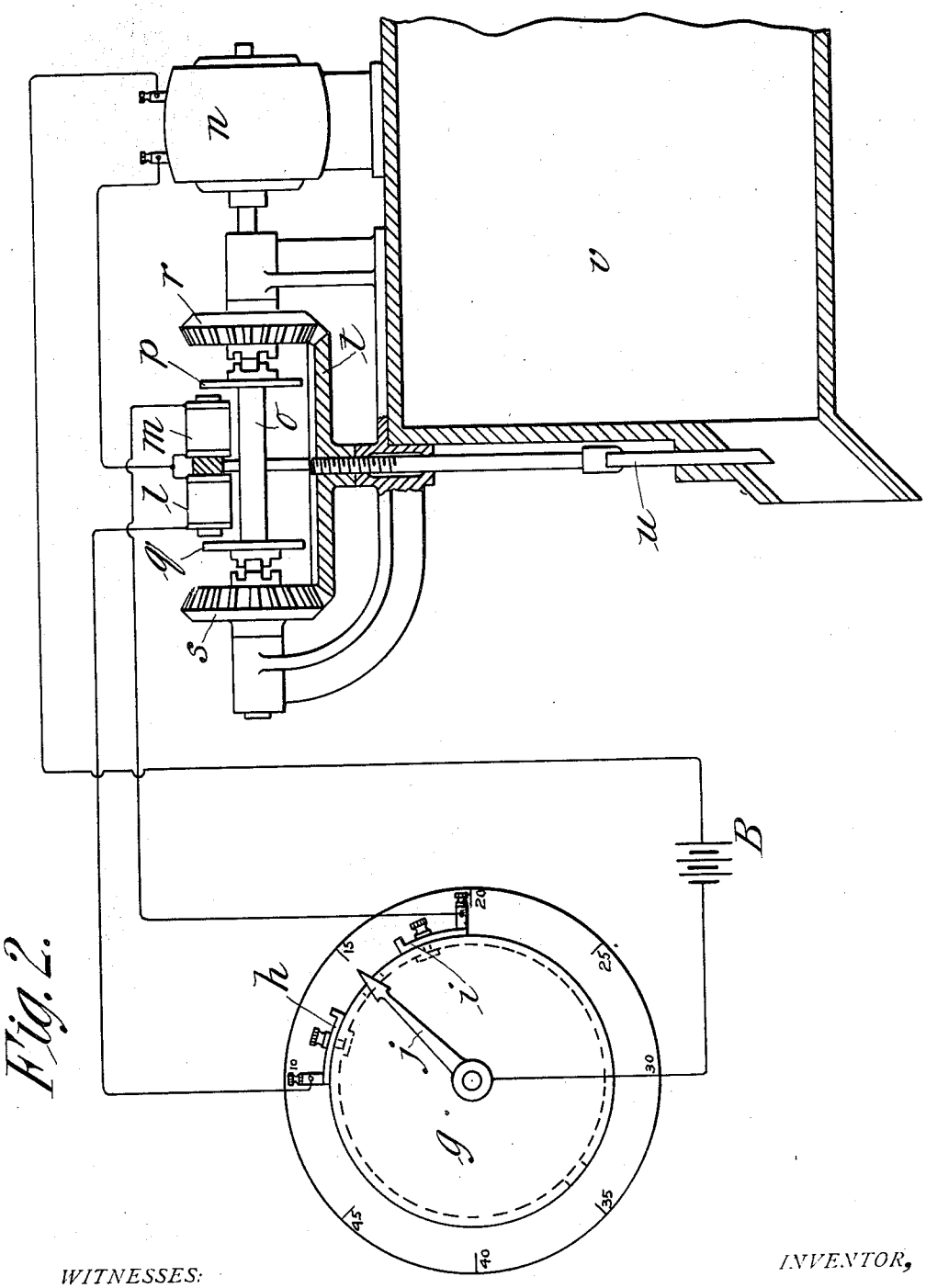

UNITED STATES PATENT OFFICE.

HOWARD BROWN, OF SPRINGFIELD, MASSACHUSETTS.

APPARATUS FOR CONTROLLING THE THICKNESS OF PAPER.

1,157,204.

Specification of Letters Patent.

Patented Oct. 19, 1915.

Application filed October 1, 1912. Serial No. 723,283.

*To all whom it may concern:*

Be it known that I, HOWARD BROWN, a citizen of the United States of America, residing at Springfield, in the county of Hampden and State of Massachusetts, have invented new and useful Improvements in Apparatus for Controlling the Thickness of Paper, of which the following is a specification.

This invention relates to an apparatus for controlling the thickness of paper while the paper is being made.

The present practice in general use among paper manufacturers for making paper of a certain weight per ream comprises a "cut and try" method which consists in taking a certain sample, as one complete sheet of the paper being made, and weighing it to determine whether the weight per ream is what is desired. If it is not, the machine making the paper is adjusted according to its needs until a sample tested is satisfactory. The objection to this practice is, first, that it is rather tedious, and, second, the operator can not tell until a considerable quantity of paper, (enough to give him a finished sample to test) is made. During the testing and adjusting of the machine a large quantity of paper off weight is made, a large amount of time is wasted, and the continual attention of a skilled operator is required. Because of these disadvantages in the present practice, applicant has invented an apparatus of an improved nature to control the manufacture of the paper so that paper "off weight" is largely eliminated and the paper is kept continually within certain limits as to thickness.

Applicant's invention comprises means operated by the paper when the paper is in the machine to control the thickness and thus the weight per ream of the paper made by the machine.

While there are many ways in which the invention can be effectively carried out, the way herein specifically described is a full disclosure of one illustrative embodiment of a preferred form of apparatus for controlling the weight of paper manufactured.

The object of the invention is to provide an apparatus which, combined with a paper making machine, will determine the weight or thickness of the paper made by the machine, as desired.

With this object in view, the invention consists in a part movable by changing thicknesses of paper, combined with controlling means operable on a movement of said part to control the quantity of paper stock delivered to the paper carrying and forming medium.

In the drawings forming part of this application, Figure 1 represents a section of the paper making machine at a point where the thickness of the paper made can be tested with the testing apparatus in place. Fig. 2 represents, in diagrammatic form, the controlling arrangement for the machine.

The invention will be described in connection with its use on a Fourdrinier machine: At a point in the machine where the paper has been sufficiently formed so that its thickness may be tested, a testing gage is arranged, as shown in Fig. 1, in such a way that the paper travels between two rotatable wheels $e$,—one on each side of the paper. These wheels are mounted on horizontal rods $f$, as shown. The gage is so made that any movement of the rods $f$, either toward or away from each other, will turn the indicating hand $j$ in either one or the other direction. The specific construction of the gage is unimportant, as commercial forms are available in which the described movement of the rods $f$ will give the desired movement of the indicating hand. Two electrical contacts $h$ and $i$ are adjustably mounted on the face of the dial $g$, which contacts are set in accordance with the limits of thickness to which the paper must be kept. The movement of the hand $j$ to one of the contacts $h$ or $i$ controls the manufacture of the paper.

Referring to Fig. 2 of the drawings, if the hand $j$, moved by the paper through the rolls $e$, touches contact $h$ the current from the battery B passes through the magnet $l$ and the motor $n$ back to the battery. The motor rotates its horizontal shaft while the magnet $l$ throws in the double sleeve clutch $o$ splined on the shaft so that the member $p$ clutches with the gear $r$ loose on the shaft. The gear $t$ is thus turned which, in an obvious manner, (as indicated), raises or lowers the valve $u$ according to the direction of rotation. The movement of the valve $u$ controls the flow of paper stock from the tank $v$ to the paper carrying medium, such as the wire in a Fourdrinier machine. If more or less paper stock is fed to the wire, the paper will change in thickness and also in weight per ream. After the thickness of the paper is within the limits set by adjustment of the contacts $h$ and $i$, the hand $j$ will leave the contact $h$, whereupon, through the magnet $l$ and the motor $n$, the current is broken and the rotation of the gear wheel $t$ and movement of the valve $u$ are stopped. When the hand $j$ touches the contact $i$, a current is obviously established through the magnet $m$ and motor $n$. The clutch member $q$ is thus caused to rotate the gear $s$ and turn the gear $t$ in an opposite direction to the former rotation, thus moving the valve $u$ in the opposite direction to that before mentioned. It will be noticed that when one clutch $q$ or $p$ is in engagement to turn the gears $s$ or $r$, the other one is out of engagement, due to the solid sleeve connection. The magnets $l$ or $m$ which pulls one clutch in engagement, pulls the other one out of engagement.

By the mechanism described, the movement of the hand $j$ of the thickness gage to stop the contact $h$ will cause a change in the thickness of the paper in one direction, while the movement to stop the contact $i$ will cause a change in the thickness of the paper in the opposite direction.

The apparatus may be constructed to operate on such small changes of thickness of the paper as will keep the paper within the desired limits of thickness and weight. As an example of one way of operating the apparatus, the stops $h$ and $i$ may be adjusted within very small limits, smaller than the actual limits of thickness desired. The valve $u$ will thus be operated to keep the thickness of the paper within the small limits set. As a consequence, although a given time interval is required for a change in the valve $u$ to affect the thickness of the paper between the rolls $e$, the thickness of the paper will begin to change in the desired direction before the actual limit of thickness in the other direction is reached. Thus by setting the limits of the instrument within the actual limits of thickness desired, the latter will always be maintained.

It is clear that the invention may be used and embodied in many forms, other than those specifically described as illustrative of the preferred method of use.

What I claim is:—

1. The combination of a paper making machine, a paper thickness gage mounted at a point in said machine where the paper is sufficiently formed to determine its thickness together with operable mechanism controlled by the movement of said gage to change the amount of paper stock fed to the machine to keep the thickness of the paper made within desired limits.

2. The combination of a paper making machine, means located at a point in the machine where the paper is sufficiently formed to determine its thickness and movable by changing thicknesses of the paper, together with mechanism operable to control the feed of paper stock to the machine controlled by the movement of said first mentioned means, whereby the thickness of the paper is maintained at the desired point.

3. The combination of a paper making machine, a valve operable to control the feed of the paper stock to the paper carrying medium in the machine, means for testing the thickness of the paper being made located at a suitable point, together with mechanism controlled by the last mentioned means and operable to move said valve, whereby the thickness of the paper manufactured is determined.

4. The combination of a paper making machine, means to feed paper stock thereto, devices, located in contact with the paper at a point in the machine where the thickness of the paper may be determined, movable on changing thicknesses of paper, electrically operable means to control the feed of the paper stock, and electrical connections between said devices and said operable means whereby the movement of said devices on changing thicknesses of paper controls said electrical connections and determines the thickness of the paper made.

5. In a paper making machine, the combination of means to feed paper stock to the machine, and a controlling valve therefor, electrically controlled means operable to open and close said valve, a device movable on changing thicknesses of the paper, together with electrical connections from said device to said controlled means arranged for a movement of the device in one direction to cause the valve to open and a movement thereof in the other direction to cause the valve to close, whereby the movement of the device controls the thickness of the paper manufactured.

6. A paper making machine having in combination a means to feed paper stock, a valve therein, electrically controlled means for opening and closing said valve to feed more or less paper stock to the machine, electrical circuits for said controlled means, together with a device located at a suitable point in the machine to test the thickness of the paper, said device being operable on changing thicknesses of paper passing through the machine to open or close said circuits whereby the valve will be partially opened or closed to control the amount of paper stock fed to the machine and thus control the thickness of the paper made.

7. In combination, a paper making machine in which paper is made in a continuous sheet, means for feeding paper stock to the paper forming medium of the machine in quantities to give the thickness of the paper desired, together with a thickness gage controlled by the thickness of the paper at a point in the continuous sheet where the paper may be tested, an indicating hand for said gage, electrical controlling devices for said first mentioned means, and circuits including the indicating hand and said devices having contacts adjustably mounted with respect to the indicating hand, all constructed and arranged so that the movement of the hand between said adjustable contacts will determine the limits of the thickness of the paper by controlling said first mentioned means, all for the purpose described.

8. In a paper machine, a calipering device to detect the thickness of the paper in control of means to vary the thickness of the paper and said means.

9. In a paper machine, a means operated when the thickness of the paper over-rides prescribed limits in control of means to vary the thickness of the paper, and said means.

10. The combination with means for regulating the amount of stock fed to a paper making machine, of means for engaging the paper, and electro-responsive means coöperating with said engaging means for controlling the operation of said regulating means to vary the amount of stock fed to the machine.

11. The combination with a stock-gate for regulating the amount of stock fed to a paper making machine of means for operating said gate, means for engaging the paper, and electro-responsive means controlled by said paper engaging means for controlling the operation of said gate-operating means.

12. The combination with a stock-gate for regulating the amount of stock fed to a paper making machine, of means for operating said gate, automatically adjustable means engaging the paper arranged to control the operation of said gate.

13. In the manufacture of paper, the combination with means for feeding paper stock to a paper making machine, of means for engaging the sheet of paper, and means arranged to control the feeding of the stock to said machine according to the thickness of the paper at said engaging-means.

14. In the manufacture of paper, the combination with means for feeding paper stock to a paper making machine, of self-adjusting means for engaging the sheet of paper, and electro-responsive means adapted to control the feeding of the paper stock to said machine according to the thickness of the paper at said engaging means.

15. In the manufacture of paper, the combination with a stock-gate for regulating the amount of paper stock fed to a paper making machine, of self-adjusting means for engaging the moving web of paper, and means coöperating with said engaging means for controlling the operation of said gate according to the thickness of the web at said engaging means.

16. In a paper making machine, the combination of two members having surfaces adapted to engage the opposite faces of a sheet of paper, one of said members being self-adjusting in accordance with the thickness of the paper, a stock-gate for regulating the amount of paper stock to said machine, means for actuating said gate, and means for controlling the operation of said actuating means in accordance with the thickness of the paper at said engaging surfaces.

HOWARD BROWN.

Witnesses:
   FRANKLIN G. NEAL,
   HARRY W. BOWEN.